United States Patent
Eklöf et al.

(10) Patent No.: US 11,812,294 B2
(45) Date of Patent: *Nov. 7, 2023

(54) TRANSFER OF MEASUREMENT CONFIGURATION INFORMATION IN WIRELESS COMMUNICATION NETWORKS

(71) Applicant: TELEFONAKTIEBOLAGET LM ERICSSON (PUBL), Stockholm (SE)

(72) Inventors: Cecilia Eklöf, Täby (SE); Gunnar Heikkilä, Gammelstad (SE); Waikwok Kwong, Solna (SE); Nianshan Shi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 428 days.

This patent is subject to a terminal disclaimer.

(21) Appl. No.: 16/624,670

(22) PCT Filed: Jul. 9, 2018

(86) PCT No.: PCT/IB2018/055051
§ 371 (c)(1),
(2) Date: Nov. 9, 2020

(87) PCT Pub. No.: WO2019/008560
PCT Pub. Date: Jan. 10, 2019

(65) Prior Publication Data
US 2020/0413275 A1 Dec. 31, 2020

Related U.S. Application Data

(60) Provisional application No. 62/529,801, filed on Jul. 7, 2017.

(51) Int. Cl.
*H04Q 1/20* (2006.01)
*H04W 16/00* (2009.01)
(Continued)

(52) U.S. Cl.
CPC .................................. *H04W 24/10* (2013.01)

(58) Field of Classification Search
CPC ..... H04W 24/10; H04W 24/08; H04W 64/00; H04L 41/5054; H04L 41/5067;
(Continued)

(56) References Cited

U.S. PATENT DOCUMENTS 8,291,312 B1 * 10/2012 Zhou ...................... G06F 16/972
715/236
8,713,138 B1 * 4/2014 Machiraju ............... H04L 43/10
709/221
(Continued)

FOREIGN PATENT DOCUMENTS

EP 2692167 A1 * 2/2014 ........... G01S 5/0018
EP 2692167 A1 2/2014
EP 2692167 B1 11/2016

OTHER PUBLICATIONS

PCT International Search Report and Written Opinion dated Oct. 2, 2018 for International Application PCT/ B2018/055051, 14 pages.

(Continued)

*Primary Examiner* — Edan Orgad
*Assistant Examiner* — Vanneilian Lalchinthang
(74) *Attorney, Agent, or Firm* — SAGE PATENT GROUP (57) ABSTRACT

Methods and related user equipment and radio network node are described in which the UE receives a measurement configuration message via the radio network node, the measurement configuration message comprising a configuration identifier associated with a measurement configuration file, and in which the UE retrieves the measurement configuration file from the radio network node using the received configuration identifier.

14 Claims, 7 Drawing Sheets

(51) Int. Cl.
*H04W 24/00* (2009.01)
*G06F 15/177* (2006.01)
*H04W 24/10* (2009.01)

(58) Field of Classification Search
CPC ...... H04L 43/16; H04L 67/06; H04J 11/0069; G01S 5/0018; H04B 17/23; H04B 17/24; H04B 17/27; H04B 17/18; G06F 16/9574; G06F 16/972
USPC .......................................................... 370/252
See application file for complete search history.

(56) References Cited

U.S. PATENT DOCUMENTS

| | | | |
|---|---|---|---|
| 2009/0227251 A1* | 9/2009 | Lei | H04W 24/08 455/425 |
| 2012/0322386 A1* | 12/2012 | Yi | H04W 24/08 455/67.11 |
| 2013/0303203 A1* | 11/2013 | Wang | H04W 68/00 455/458 |
| 2015/0319795 A1* | 11/2015 | Kim | H04W 76/15 370/329 |
| 2017/0019810 A1* | 1/2017 | Wu | H04L 5/14 |
| 2017/0251499 A1* | 8/2017 | Radulescu | H04W 72/1289 |
| 2018/0213427 A1* | 7/2018 | Uemura | H04W 24/10 |
| 2018/0270682 A1* | 9/2018 | Zacharias | H04W 24/10 |

OTHER PUBLICATIONS

Huawei, 3GPP TSG-RAN WG5 Meeting #75, R5-172467, "Introduction of 8.4.1.53 Measurement Control and Report: Application Layer Data Measurement", Hangzhou, China, May 15-19, 2017, 8 pages.

Ericsson LM, 3GPP TSG-SA4 Meeting #93, S4-170454, "Correction for QoE Measurement Collection", Busan, Republic of Korea, Apr. 24-28, 2017, 4 pages.

Communication Under Rule 71(3) EPC for European Patent Application No. 18752262.8 dated Jun. 21, 2022, 5 pages.

* cited by examiner

TRANSFER OF MEASUREMENT CONFIGURATION INFORMATION IN WIRELESS COMMUNICATION NETWORKS

RELATED APPLICATIONS

The present application claims the benefits of priority of U.S. Provisional Patent Application No. 62/529,801, entitled "TRANSFER OF MEASUREMENT CONFIGURATION INFORMATION IN WIRELESS COMMUNICATION NETWORKS", and filed at the United States Patent and Trademark Office on Jul. 7, 2017, the content of which is incorporated herein by reference.

TECHNICAL FIELD

The present description generally relates to wireless communications and wireless communication networks, and more particularly relates to transfer of measurement configuration information in wireless communication networks.

INTRODUCTION

In 3GPP release 14, there is a work item for "Quality of Experience (QoE) Measurement Collection" for UMTS. A corresponding work item has also been approved for LTE in release 15 and later it will also applicable for NR. The purpose of the work item is to start measurements in the UE to collect information about the quality of streaming services used in the UE. The streaming service is typically a $3^{rd}$ party streaming application on top of a packet-switched interactive radio access bearer (i.e., a packet-switched radio bearer) defined in the radio access network (RAN). The purpose of the measurement collection is to be able to improve the quality of the streaming service.

Figure 1:
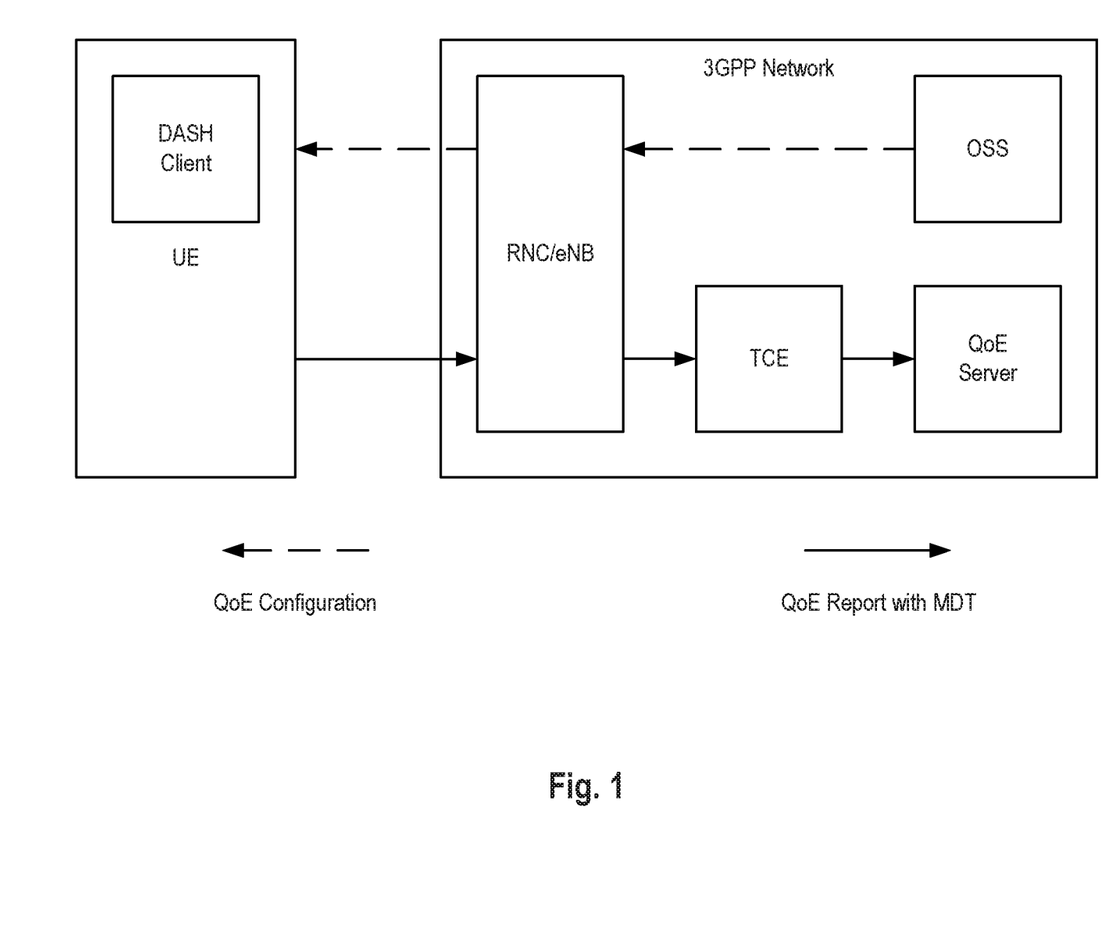
FIG. 1 is a schematic diagram of an example end-to-end flow for quality of experience, QoE, measurement collection in accordance with some embodiments.

The measurements may be initiated towards the RAN directly from an operation and management (O&M) node in a generic way for a group of user equipments (UEs). The measurements may also be initiated towards the RAN by receiving a "trace request" from the core network. The configuration of the measurements includes the measurement details, which are encapsulated in a container or file that is transparent to the RAN, and the address to the trace collection entity (TCE) to which the collected measurements should be sent. The configuration information typically comprises a dynamic adaptive streaming over HTTP (DASH) file specifying how the data are to be collected. The RAN then starts the measurements in the UE by sending the configuration information transparently to the UE. The end-to-end signaling flow for configuring and reporting the measurements is shown in FIG. 1.

The existing UMTS solution is specified in terms of existing RRC measurement procedures. The configuration information is carried in a MEASUREMENT CONTROL message in the form of a transparent container. The measurement results are carried in a MEASUREMENT REPORT message, again in the form of a transparent container. The RAN is responsible for relaying the results transparently to the trace collection entity.

When initiated by the core network, the measurement is directed towards a specific UE. The "trace request" referred to above is realized, in UMTS, as the RANAP message CN INVOKE TRACE, which carries the configuration information with the measurement details and the IP address to the trace collection entity to which the collected measurements should be sent. Similar mechanism exists in LTE S1AP in the TRACE START message. A similar mechanism may also be defined for NR as well.

However, the QoE configuration messages can be relatively large, and due to some issues with transferring large files in RRC messages, a user plane solution is being discussed in LTE and if agreed it may also be ported to UMTS. It is however still important that any user plane solution can be activated in the same way as other RAN-controlled measurements, as described above, so that, for instance, geographical filtering and other possible RAN criteria can be observed.

SUMMARY

In the current solution, the RAN sends the measurement configuration file to the UE when configuring QoE measurements. When the UE enters the idle mode, the configuration is cleared and when the UE enters the connected mode again, the measurement configuration file is sent again. As the measurement configuration file is quite large, sending the same file multiple times may consume unnecessary resources. It is also likely that the measurement configuration file has not changed since it was last sent, but since it is cleared in the UE, there is a need to resend the information.

The measurement configuration file contains information on how the UE should perform certain measurements when and/or if it starts a streaming service. However, many UEs may not use streaming services (or other application layer services) at all during a long time, and thus sending the measurement configuration file to these UEs may also waste resources.

A different solution is proposed. Broadly, when an O&M node or a core network node initiates a new QoE configuration file, the configuration file is transferred to the RAN with a unique configuration identifier. Then the RAN only sends the configuration identifier to the UE. The RAN provides the configuration file to the UE only when the UE requests it. The configuration identifier is usually very small compared to the configuration file. As such, transmitting the configuration identifier every time the UE goes from idle mode to connected mode consumes less resources than transmitting the whole configuration file.

When the UE gets the configuration identifier from the RAN, it uses the configuration identifier to retrieve or fetch the configuration file from the RAN. Once fetched, the configuration file and the configuration identifier are kept in the UE for at least a certain amount of time and are not cleared immediately when the UE transitions to idle mode or when the starting of new measurements is stopped when the UE leaves the measurement area. To avoid unnecessarily retrieving the configuration file, the UE may first compare the received configuration identifier with any still valid/existing configuration identifier it previously received and/or used when it last fetched the configuration file, and only fetches the configuration file if these configuration identifiers are different.

Optionally, even if the configuration identifiers do not match, the UE may delay fetching the configuration file until a streaming session is started, to avoid using unnecessary capacity. In this case, the UE does not fetch the configuration file until the application layer asks for it.

The solution applies to UTRAN, E-UTRAN and NR.

According to one aspect, some embodiments include a method performed by user equipment, UE. The method generally comprises receiving a measurement configuration message via a radio network node, the measurement configuration message comprising a configuration identifier associated with a measurement configuration file, and retrieving the measurement configuration file from the radio network node using the received configuration identifier.

In some embodiments, receiving the measurement configuration message may be performed over a control plane while retrieving the measurement configuration file may also be performed over the control plane.

In some embodiments, the measurement configuration message is a radio resource control, RRC, message, and the measurement configuration file is retrieved using RRC messages.

In some embodiments, the method may comprise, or further comprise, determining a need for retrieving the measurement configuration file from the radio network node prior to retrieving the measurement configuration file from the radio network node using the configuration identifier. In such embodiments, determining the need for retrieving the measurement configuration file from the radio network node may comprise determining that the received configuration identifier is different from a previously received configuration identifier, and/or determining that an application layer service requiring measurement is about to start or has already started.

In some embodiments, retrieving the measurement configuration file from the radio network node using the received configuration identifier may comprise transmitting a request for the measurement configuration file to the radio network node, and receiving the measurement configuration file from the radio network node.

In some embodiments, the measurement configuration file and the associated configuration identifier are stored at the UE for a predetermined amount of time.

According to another aspect, some embodiments include a UE configured, or operable, to perform one or more UE functionalities (e.g. steps, actions, etc.) as described herein.

In some embodiments, the UE may comprise one or more communication interfaces configured to communicate with one or more other UEs, with one or more radio network nodes and/or with one or more network nodes (e.g., O&M nodes, core network nodes), and processing circuitry operatively connected to the communication interface, the processing circuitry being configured to perform one or more UE functionalities as described herein. In some embodiments, the processing circuitry may comprise at least one processor and at least one memory storing instructions which, upon being executed by the processor, configure the at least one processor to perform one or more UE functionalities as described herein.

In some embodiments, the UE may comprise one or more functional modules configured to perform one or more UE functionalities as described herein.

According to another aspect, some embodiments include a computer program product comprising a non-transitory computer-readable medium storing instructions (e.g., computer readable program code) which, upon being executed by processing circuitry (e.g., a processor) of the UE, configure the processing circuitry to perform one or more UE functionalities as described herein.

According to another aspect, some embodiments include a method performed by radio network node. The method generally comprises transmitting a measurement configuration message to a user equipment, UE, the measurement configuration message comprising a configuration identifier associated with a measurement configuration file, and providing the measurement configuration file to the UE.

In some embodiments, transmitting the measurement configuration message may be performed over a control plane while providing the measurement configuration file may also be performed over the control plane.

In some embodiments, the measurement configuration message may be a radio resource control, RRC, message, and the measurement configuration file may be provided using RRC messages.

In some embodiments, the method may comprise, or further comprise, receiving the measurement configuration file and the associated configuration identifier from a network node.

In some embodiments, providing the measurement configuration file to the UE may comprise receiving a request for the measurement configuration file from the UE, and transmitting the measurement configuration file to the UE.

According to another aspect, some embodiments include a radio network node configured, or operable, to perform one or more radio network node functionalities (e.g. steps, actions, etc.) as described herein.

In some embodiments, the radio network node may comprise one or more communication interfaces configured to communicate with one or more UEs, with one or more other radio network nodes and/or with one or more network nodes (e.g., O&M node, core network node), and processing circuitry operatively connected to the communication interface, the processing circuitry being configured to perform one or more radio network node functionalities as described herein. In some embodiments, the processing circuitry may comprise at least one processor and at least one memory storing instructions which, upon being executed by the processor, configure the at least one processor to perform one or more radio network node functionalities as described herein.

In some embodiments, the radio network node may comprise one or more functional modules configured to perform one or more radio network node functionalities as described herein.

According to another aspect, some embodiments include a computer program product comprising a non-transitory computer-readable medium storing instructions (e.g., computer readable program code) which, upon being executed by processing circuitry (e.g., a processor) of the radio network node, configure the processing circuitry to perform one or more radio network node functionalities as described herein.

Some embodiments may enable the transmission of a measurement configuration file associated with QoE measurements to a UE only when necessary. Hence, in some embodiments, the measurement configuration file may not need to be transferred multiple times if the measurement configuration file does not change. In some embodiments, the measurement configuration file may not have to be transferred at all if the UE never uses streaming services.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 2:
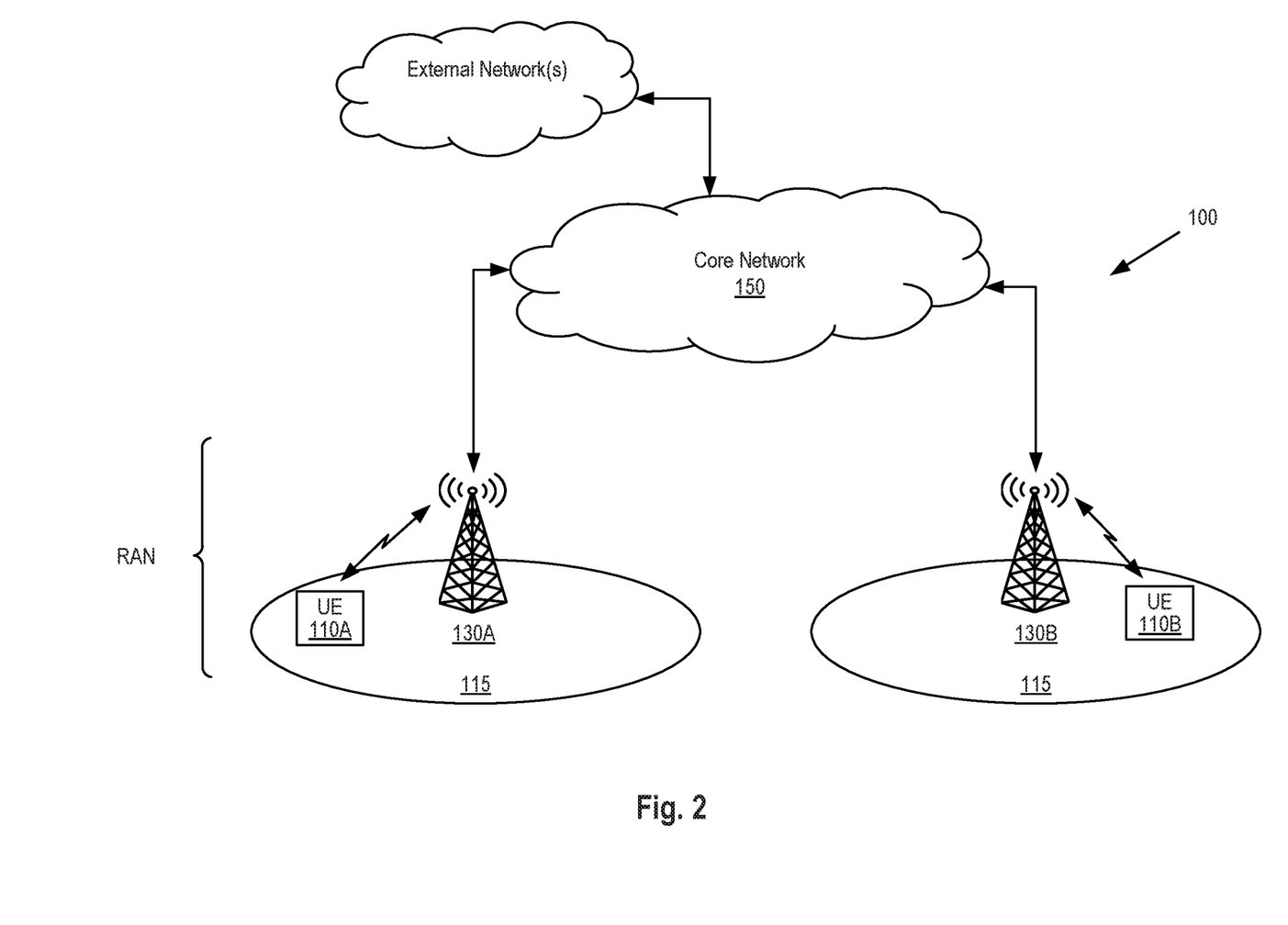
FIG. 2 is a schematic diagram of an example communication network in accordance with some embodiments.

FIG. 2 illustrates an example of a wireless network 100 that may be used for wireless communications. Wireless network 100 includes UEs 110A-110B (collectively referred to as UE or UEs 110) and a plurality of radio network nodes 130A-130B (e.g., NB s and/or RNCs in UMTS, eNBs in LTE, gNBs in NR, etc.) (collectively referred to as radio network node or radio network nodes 130) directly or indirectly connected to a core network 150 which may comprise a plurality of core network nodes (e.g., SGSNs and/or GGSNs in UMTS, MMEs, SGWs, and/or PGWs in LTE/EPC, AMFs, SMFs, and/or UPFs in NGC, etc.) (collectively referred to as core network node or core network nodes). The network 100 may use any suitable radio access network (RAN) deployment scenarios, including UMTS Terrestrial Radio Access Network, UTRAN, Evolved UMTS Terrestrial Radio Access Network, EUTRAN, and Next Generation Radio Access Network, NG-RAN. UEs 110 within coverage areas 115 may each be capable of communicating directly with radio network nodes 130 over a wireless interface. In certain embodiments, UEs may also be capable of communicating with each other via device-to-device (D2D) communication.

As an example, UE 110A may communicate with radio network node 130A over a wireless interface. That is, UE 110A may transmit wireless signals to and/or receive wireless signals from radio network node 130A. The wireless signals may contain voice traffic, data traffic, control signals, and/or any other suitable information. In some embodiments, an area of wireless signal coverage associated with a radio network node 130 may be referred to as a cell.

Broadly, when a network node such as an operation and management (O&M) node or a core network node initiates a new QoE measurement configuration file, the measurement configuration file (which may also be referred to as measurement configuration container or as measurement configuration information) containing the QoE measurement parameters is transferred to and stored at a radio network node (e.g. radio network node 130) in the radio access network. The file is transferred and stored with a unique configuration identifier. The configuration identifier is then sent to the UE (without the configuration file), by the radio access network, when QoE measurements are initiated. The radio access network may send the configuration identifier to the UE in an RRC reconfiguration message, possibly via a RRCConnectionReconfiguration message in a radio access network operating according to the LTE standards, or via a RRC Measurement Control message in a radio access network operating according to the UMTS standards. The configuration identifier is significantly smaller in size compared to the size of the measurement configuration file. As such, sending the configuration identifier every time QoE measurements are initiated or every time the UE goes from idle mode to connected mode consumes less resources than sending the full measurement configuration file.

Currently, only QoE measurements for streaming services have been included in the specifications, but in later releases, other type of application layer measurements may be added. Thus, while the description mostly describes QoE-related measurements, the concept as such is valid for any type of application layer measurements.

Figure 3:
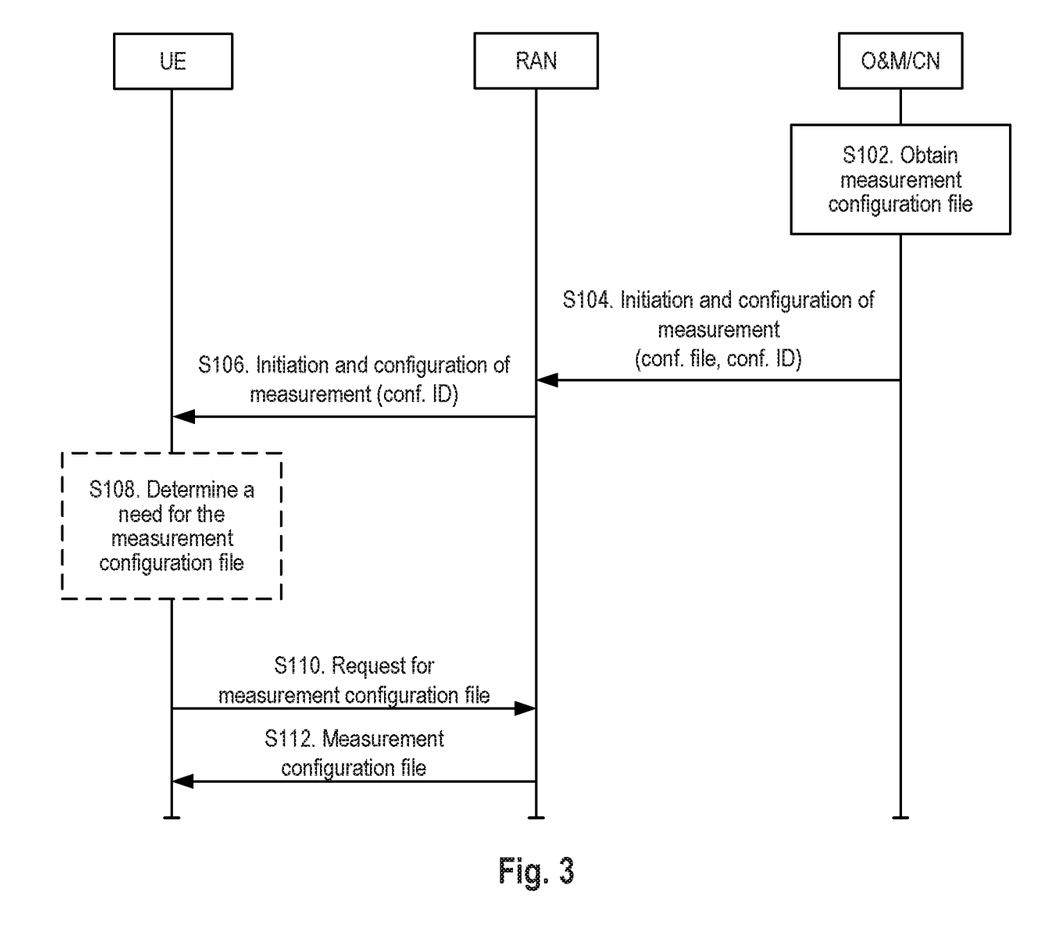
FIG. 3 is a signaling diagram in accordance with some embodiments.

Referring to FIG. 3, a high-level signaling and operating diagram according to some embodiments is illustrated. As shown, a network node in a core network 150, e.g., an O&M node or another core network node, obtains a (new) QoE measurement configuration file (action S102). The network node may generate the file itself or may obtain the file from another node. Regardless of how the network node obtains the measurement configuration file, the network node then transfers the measurement configuration file to a radio network node (e.g., a RNC in a UMTS network, an eNB in a LTE network, etc.) with a configuration identifier (action S104).

The radio network node then transmits only the configuration identifier to the UE (action S106). In other words, even though the radio network node receives both the measurement configuration file and the associated configuration identifier, the radio network node transmits the configuration identifier without the associated measurement configuration file.

In some embodiments, the configuration identifier may be transmitted as part of a measurement configuration message (e.g., a RRCConnectionReconfiguration message in LTE, a RRC Measurement Control message in UMTS). Other RRC messages are also possible.

Once the UE received the configuration identifier, the UE uses the received configuration identifier to retrieve the measurement configuration file from the radio network node (actions S110 and S112). The retrieval of the measurement configuration file may also be done using appropriate RRC messages.

In some embodiments, the UE keeps the configuration file, and the associated configuration identifier, for at least a certain amount of time and does not clear the configuration file, and the associated configuration identifier, immediately when it transitions from connected mode to idle mode or when the starting of new measurements is stopped when the UE leaves the measurement area.

To avoid the UE unnecessary retrieving the measurement configuration file, the UE may, in some embodiments, determine a need to retrieve the measurement configuration file prior to retrieving it (action S108). In some embodiments, determining a need to retrieve the measurement configuration file may comprise determining that the received configuration identifier is different from a previously received configuration identifier. For instance, the UE may compare the received configuration identifier with the configuration identifier it used when it last retrieved the measurement configuration file. The UE determines a need to retrieve the measurement configuration file only if the received configuration identifier and the previously received and possibly used configuration identifier are different.

Figure 4:
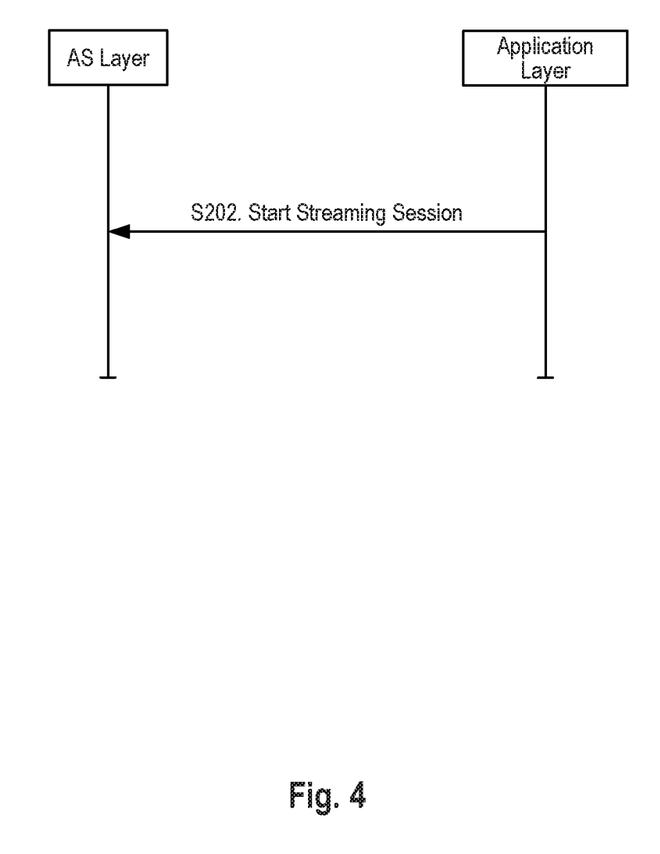
FIG. 4 is another signaling diagram in accordance with some embodiments.

In some embodiments, determining a need to retrieve the measurement configuration file may additionally or alternatively comprise determining that an application layer service (e.g., a streaming service) for which QoE measurements are required is about to start or has already started. For instance, if QoE measurements are required for streaming services, the UE may wait for such a service to be started to retrieve the measurement configuration file. Understandably, waiting for the start, or imminent start, of an application layer service for which QoE measurements are required to retrieve the measurement configuration file may avoid wasting resource for transmitting the measurement configuration file when the UE rarely, or even never, uses application layer services for which QoE measurements are required. To allow the UE to retrieve the measurement configuration file only when an application layer service for which QoE measurements are required is about to start or has already started, the layer(s) responsible for retrieving the measurement configuration file need to be informed about the start or imminent start of the application layer service. The indication of the start or imminent start of the application layer service may be sent as an internal message or command within the UE. For instance, as shown in FIG. 4, the application layer responsible for the application layer service for which QoE measurements are required informs the access stratum (AS) layer in the UE that an application layer service, e.g., a streaming session, is starting (action S202).

Understandably, even if the received configuration identifier is different from the previously received configuration identifier, or if previously received configuration identifier is lacking, the UE may delay the retrieval of the measurement configuration file until an application layer service, e.g., a streaming session, is started.

In some embodiments, the configuration of QoE measurements may be done by using RRC messages. In some other embodiments, the configuration may be done using non-access stratum (NAS) messages, that is the configuration identifier associated with the measurement configuration file may be sent in a NAS message. In still other embodiments, the configuration identifier associated with the measurement configuration file may be indicated to the UE by O&M.

Figure 5:
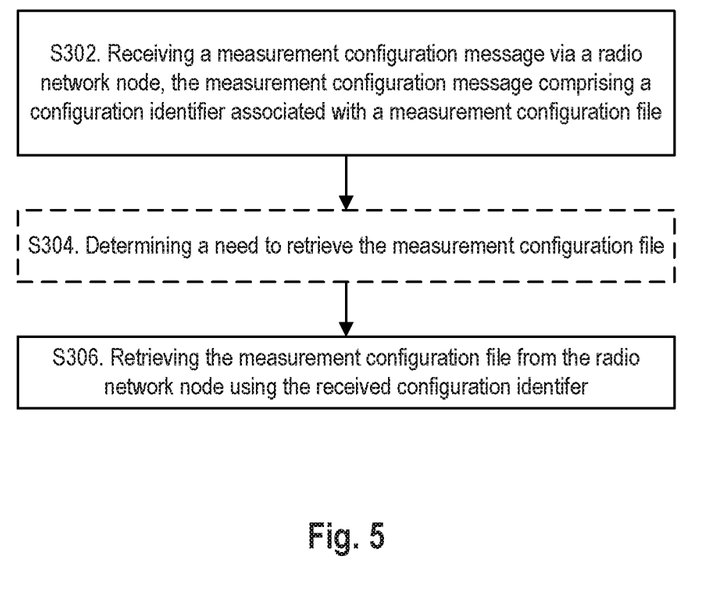
FIG. 5 is a flow chart of operations of a user equipment in accordance with some embodiments.

FIG. 5 is a flow chart that illustrates operations of the UE 110 in accordance with some embodiments. As illustrated, the UE 110 receives a measurement configuration message via a radio network node (e.g., radio network node 130), the measurement configuration message comprising a configuration identifier associated with a measurement configuration file (action S302).

Optionally, the UE 110 determines a need to retrieve the measurement configuration file prior to retrieving the measurement configuration file from the radio network node (action S304). Different needs may cause the UE to retrieve the measurement configuration file. For instance, in some embodiments, the UE may determine a need to retrieve the measurement configuration file when the received configuration identifier is different from a previously received (and possibly used) configuration identifier. Understandably, if the received configuration identifier is the same as the one previously received, the UE 110 may refrain from retrieving the measurement configuration file since the measurement configuration file has not changed. In other embodiments, the UE 110 may determine, or further determine, a need to retrieve the measurement configuration file when the UE determines that an application layer service requiring QoE measurements (e.g., a streaming service) is about to start or has already started. In such embodiments, the UE may wait for the start of the application layer service requiring QoE measurements to retrieve the measurement configuration file.

At some point in time after the reception of the measurement configuration message, the UE 110 retrieves the measurement configuration file from the radio network node 130 using the received configuration identifier (action S306). In some embodiments, when retrieving the measurement configuration file from the radio network node, the UE 110 may transmit a request for the measurement configuration file to the radio network node, and then receive the measurement configuration file from the radio network node.

Figure 6:
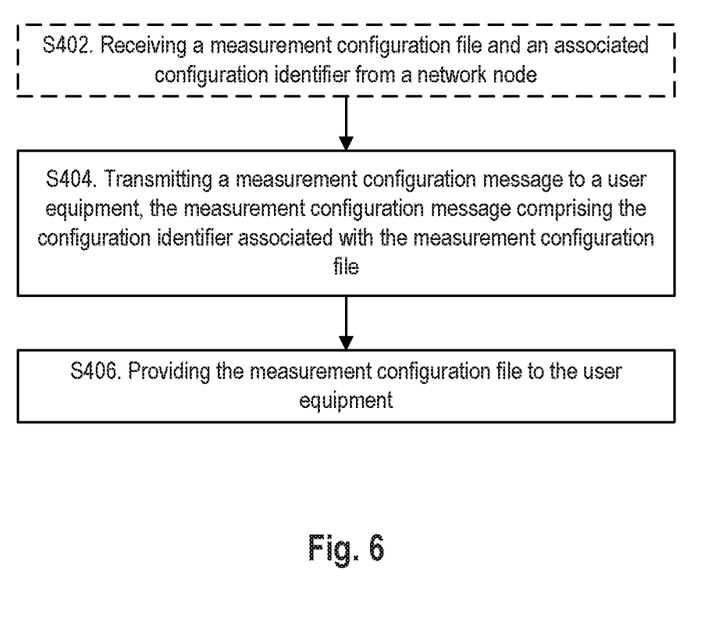
FIG. 6 is a flow chart of operations of a radio network node in accordance with some embodiments.

FIG. 6 is a flow chart that illustrates operations of the radio network node 130 in accordance with some embodiments. As illustrated, the radio network node 130 optionally receives a measurement configuration file and an associated configuration identifier from a network node (action S402). In some embodiments, the network node may be a core network node or an O&M node.

The radio network node 130 then transmits a measurement configuration message to a user equipment (e.g., UE 110), the measurement configuration message comprising the configuration identifier associated with the measurement configuration file, but not the measurement configuration file itself (action S404).

At some point in time after the transmission of the measurement configuration message, the radio network node 130 provides the measurement configuration file to the UE (action S406). In some embodiments, when providing the measurement configuration file to the UE, the radio network node 130 may receive a request for the measurement configuration file from the UE, and then transmit the measurement configuration file to the UE.

Some embodiments of a UE 110 will now be described with respect to FIGS. 7 and 8. Even though the expression User Equipment is used throughout the description, it is to be understood that the expression is used generically. In that sense, other communication standards may use different terminology when describing user equipment. For instance, in addition to User Equipment, 3GPP also used mobile terminal (MT). For its part, 3GPP2 uses the term access terminal (AT) and IEEE 802.11 (also known as WiFi™) uses the term station (STA).

Figure 7:
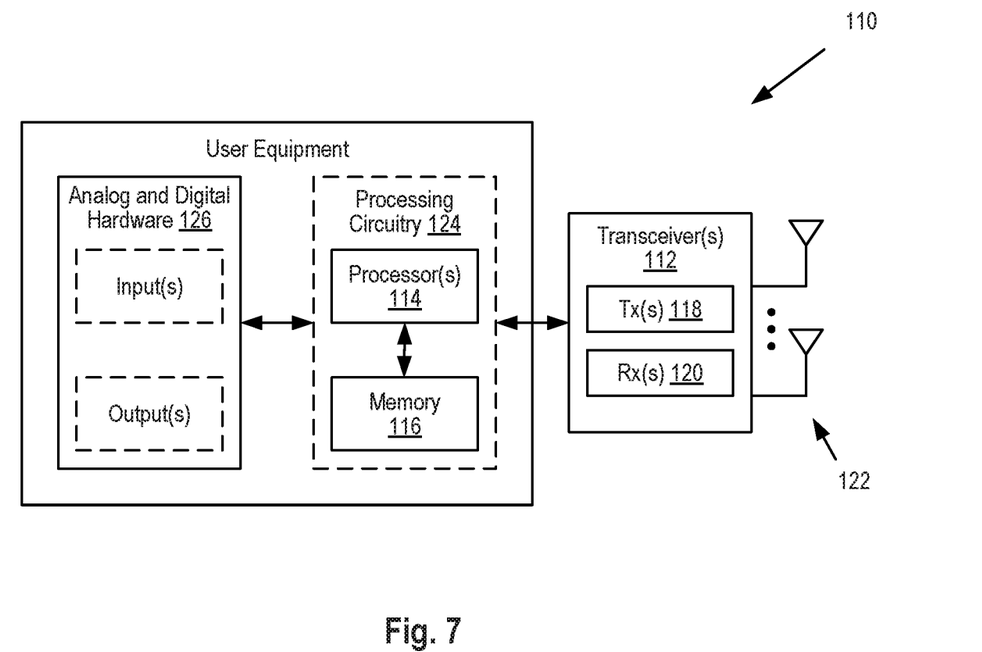
FIG. 7 is a block diagram of a user equipment in accordance with some embodiments.

FIG. 7 is a block diagram of an exemplary UE 110 in accordance with some embodiments. UE 110 includes one or more of a transceiver 112, a processor 114, and a memory 113. In some embodiments, the transceiver 112 facilitates transmitting wireless signals to and receiving wireless signals from radio network node 130 (e.g., via transmitter(s) (Tx) 118, receiver(s) (Rx) 120 and antenna(s) 122). The processor 114 executes instructions to provide some or all of the functionalities described above as being provided by UE 110, and the memory 116 stores the instructions to be executed by the processor 114. In some embodiments, the processor 114 and the memory 116 form processing circuitry 124.

The processor 114 may include any suitable combination of hardware to execute instructions and manipulate data to perform some or all of the described functions of UE 110, such as the functions of UE 110 described above. In some embodiments, the processor 114 may include, for example, one or more computers, one or more central processing units (CPUs), one or more microprocessors, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by a processor 114. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 114 of UE 110.

Other embodiments of UE 110 may include additional components beyond those shown in FIG. 7 that may be responsible for providing certain aspects of the UE's functionalities, including any of the functionalities described above and/or any additional functionalities (including any functionality necessary to support the solution described above). As just one example, UE 110 may include analog and/or digital hardware 126 such as input devices and circuits and output devices and circuits. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
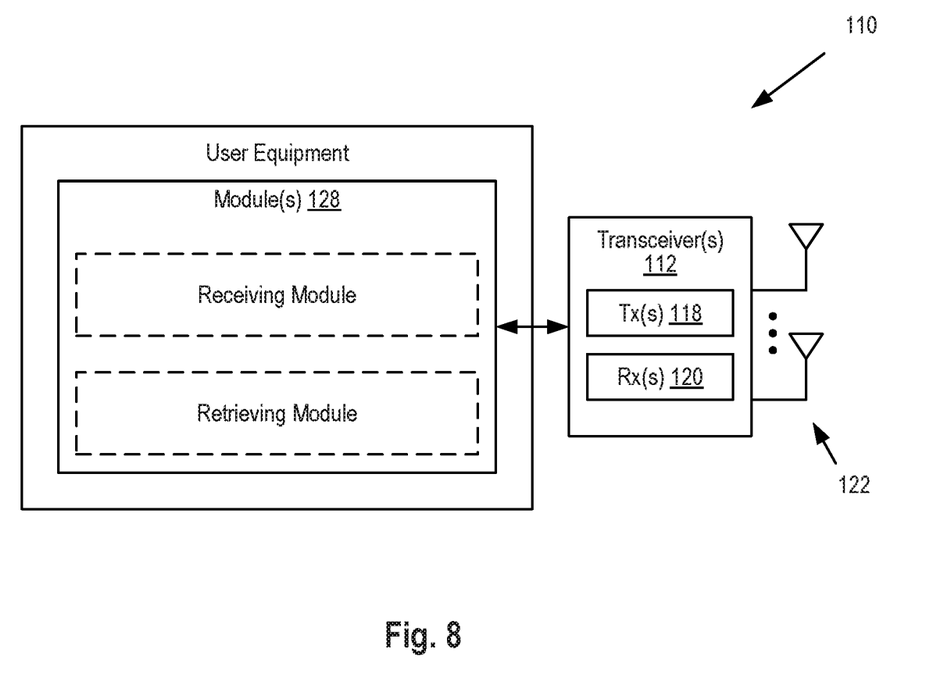
FIG. 8 is another block diagram of a user equipment in accordance with some embodiments.

FIG. 8 is a block diagram of another exemplary UE 110 in accordance with some embodiments. As illustrated, in some embodiments, the UE 110 may comprise a series of modules (or units) 128 configured to implement some or all of the functionalities of the UE 110 described above. More particularly, in some embodiments, the UE 110 may comprise a receiving module configured to receive a measurement configuration message via a radio network node, the measurement configuration message comprising a configuration identifier associated with a measurement configuration file, and a retrieving module configured to retrieve the measurement configuration file from the radio network node using the received configuration identifier.

It will be appreciated that the various modules 128 may be implemented as combination of hardware and/or software, for instance, the processor 114, memory 116 and transceiver(s) 112 of UE 110 shown in FIG. 7. Some embodiments may also include additional modules to support additional and/or optional functionalities.

Figure 9:
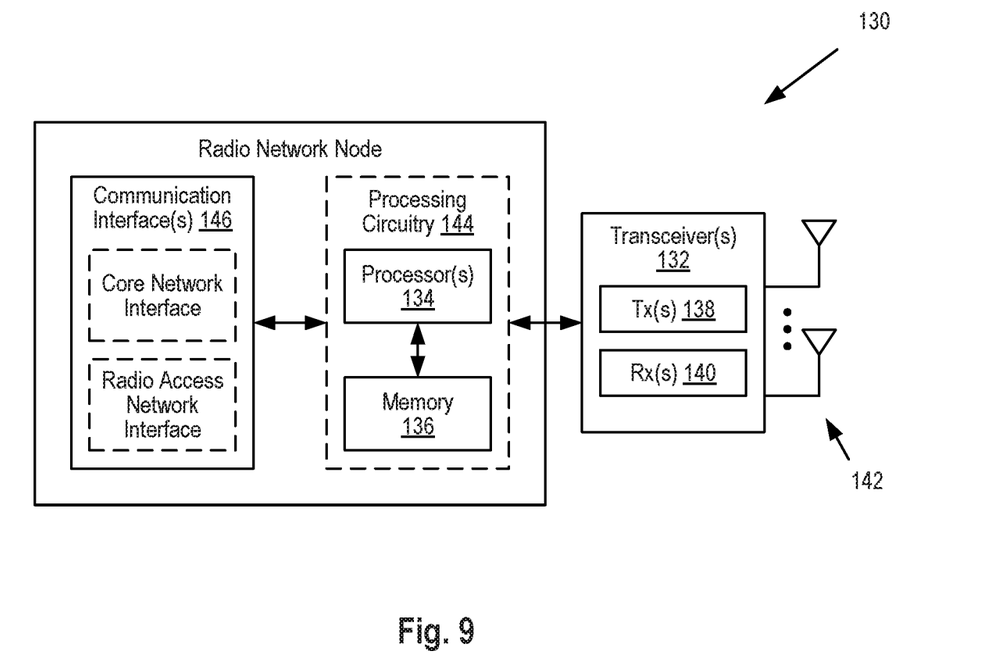
FIG. 9 is a block diagram of a radio network node in accordance with some embodiments.

Embodiments of a radio network node 130 will now be described with respect to FIGS. 9 and 10. FIG. 9 is a block diagram of an exemplary radio network node 130, in accordance with certain embodiments. Radio network node 130 may include one or more of a transceiver 132, a processor 134, a memory 136, and a communication interface 146. In some embodiments, the transceiver 132 facilitates transmitting wireless signals to and receiving wireless signals from UE 110 (e.g., via transmitter(s) (Tx) 138, receiver(s) (Rx) 140, and antenna(s) 142). The processor 134 executes instructions to provide some or all of the functionalities described above as being provided by a radio network node 130, the memory 136 stores the instructions to be executed by the processor 134. In some embodiments, the processor 134 and the memory 136 form processing circuitry 144. The communication interface(s) 146 enable the radio network 130 to communicate with other network nodes, including other radio network nodes (via a radio access network interface) and core network nodes (via a core network interface).

The processor 134 may include any suitable combination of hardware to execute instructions and manipulate data to perform some or all of the described functions of radio network node 130, such as those described above. In some embodiments, the processor 134 may include, for example, one or more computers, one or more central processing units (CPUs), one or more microprocessors, one or more application specific integrated circuits (ASICs), one or more field programmable gate arrays (FPGAs) and/or other logic.

The memory 136 is generally operable to store instructions, such as a computer program, software, an application including one or more of logic, rules, algorithms, code, tables, etc. and/or other instructions capable of being executed by a processor 134. Examples of memory 136 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the communication interface 146 is communicatively coupled to the processor 134 and may refer to any suitable device operable to receive input for radio network node 130, send output from radio network node 130, perform suitable processing of the input or output or both, communicate to other devices, or any combination of the preceding. The communication interface may include appropriate hardware (e.g., port, modem, network interface card, etc.) and software, including protocol conversion and data processing capabilities, to communicate through a network.

Other embodiments of radio network node 130 may include additional components beyond those shown in FIG. 9 that may be responsible for providing certain aspects of the radio network node's functionalities, including any of the functionalities described above and/or any additional functionalities (including any functionality necessary to support the solutions described above). The various different types of radio network nodes may include components having the same physical hardware but configured (e.g., via programming) to support different radio access technologies, or may represent partly or entirely different physical components.

Figure 10:
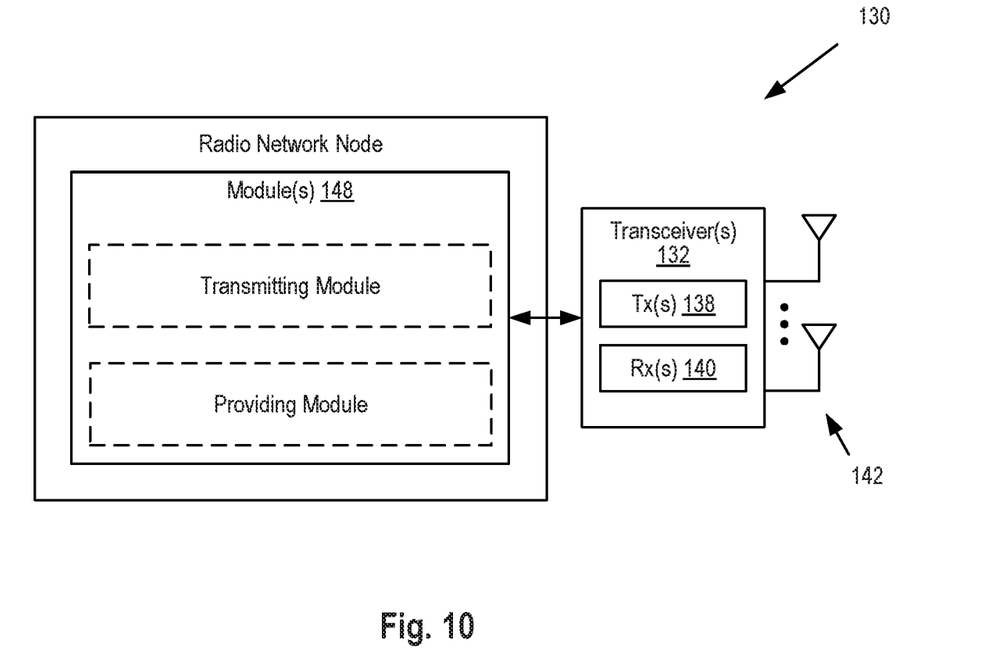
FIG. 10 is another block diagram of a radio network node in accordance with some embodiments.

FIG. 10 is a block diagram of another exemplary radio network node 130 in accordance with some embodiments. As illustrated, in some embodiments, the radio network node 130 may comprise a series of modules (or units) 148 configured to implement the functionalities of the radio network node 130 described above. Referring to FIG. 10, in some embodiments, the radio network node 130 may comprise a transmitting module configured to transmit a measurement configuration message to a user equipment, the measurement configuration message comprising a configuration identifier associated with a measurement configuration file, and a providing module configured to provide the measurement configuration file to the user equipment.

It will be appreciated that the various modules 148 may be implemented as combination of hardware and/or software, for instance, the processor 134, memory 136 and transceiver(s) 132 of radio network node 130 shown in FIG. 9. Some embodiments may also include additional modules to support additional and/or optional functionalities.

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

ABBREVIATIONS

The present description may comprise one or more of the following abbreviation:
3GPP Third Generation Partnership Project
AMF Access Management Function
AMS Application Measurements Server
APN Access Point Name
AS Access Stratum
CN Core Network
D2D Device-to-Device
DASH Dynamic Adaptive Streaming over HTTP
DRB Data Radio Bearer
eNB evolved Node B
EPC Evolved Packet Core
E-UTRAN Evolved Universal Terrestrial Radio Access Network
GGSN Gateway GPRS Support Node
gNB Next Generation Node B (a Node B supporting NR)
HSPA High-Speed Packet Access
LTE Long Term Evolution
MDT Minimization of Drive Tests
MME Mobility Management Entity
NAS Non-Access Stratum
NB Node B
NGAP NG Application Protocol
NGC Next Generation Core
NR New Radio
O&M Operation and Maintenance
PGW Packet Data Network Gateway
PS Packet Switched
QoE Quality of Experience
RAB Radio Access Bearer
RAN Radio Access Network
RANAP Radio Access Network Application Part
RNC Radio Network Controller
RRC Radio Resource Control
S1AP S1 Application Protocol
SGSN Serving GPRS Support Node
SGW Serving Gateway
SMF Session Management Function
SRB Signaling Radio Bearer
UE User Equipment
UMTS Universal Mobile Telecommunications System
UPF User Plane Function
URL Uniform Resource Locator
UTRAN Universal Terrestrial Radio Access Network
XML Extensible Markup Language

What is claimed is:

1. A method in a user equipment (UE), the method comprising:
  receiving a measurement configuration message via a radio network node, the measurement configuration message comprising a configuration identifier associated with a measurement configuration file,
    wherein the measurement configuration message is received over a control plane, and
    wherein the measurement configuration message is a radio resource control (RRC) message;
  comparing the received configuration identifier with a previously received configuration identifier, wherein the previously received configuration identifier is associated with last retrieved measurement configuration file;
  determining a need for retrieving the measurement configuration file from the radio network node prior to retrieving the measurement configuration file from the radio network node,
    wherein determining the need for retrieving the measurement configuration file is based on a result of the comparison that the received configuration identifier is different from the previously received configuration identifier; and retrieving, based on the determination, the measurement configuration file from the radio network node using the received configuration identifier,
    wherein the retrieving of the measurement configuration file from the radio network node using the received configuration identifier comprises:
    transmitting a request for the measurement configuration file to the radio network node; and
    receiving the measurement configuration file from the radio network node.

2. The method of claim 1, wherein determining the need for retrieving the measurement configuration file comprises determining that an application layer service requiring measurement is about to start or has already started.

3. The method of claim 1,
    wherein the measurement configuration file and the associated configuration identifier are stored at the UE for a predetermined amount of time.

4. The method of claim 1, wherein the measurement configuration file is retrieved over the control plane, and wherein the measurement configuration file is retrieved using the RRC message.

5. A user equipment (UE), comprising:
    circuitry configured to:
        receive a measurement configuration message via a radio network node, the measurement configuration message comprising a configuration identifier associated with a measurement configuration file,
            wherein the measurement configuration message is received over a control plane, and
            wherein the measurement configuration message is a radio resource control (RRC) message;
        compare the received configuration identifier with a previously received configuration identifier, wherein the previously received configuration identifier is associated with last retrieved measurement configuration file;
        determine a need for retrieving the measurement configuration file from the radio network node prior to retrieving the measurement configuration file from the radio network node,
            wherein the determination of the need for retrieving the measurement configuration file is based on a result of the comparison that the received configuration identifier is different from the previously received configuration identifier; and
        retrieve, based on the determination, the measurement configuration file from the radio network node using the received configuration identifier,
            wherein the retrieving of the measurement configuration file from the radio network node using the received configuration identifier comprises:
            transmission of a request for the measurement configuration file to the radio network node; and
            reception of the measurement configuration file from the radio network node.

6. The UE of claim 5, is further configured to:
    determine a need for retrieving the measurement configuration file from the radio network node prior to retrieving the measurement configuration file from the radio network node using the configuration identifier,
    wherein determining the need for retrieving the measurement configuration file comprises determining that the received configuration identifier is different from the previously received configuration identifier.

7. The UE of claim 6, is further configured to, when determining the need for retrieving the measurement configuration file, determine that an application layer service requiring measurement is about to start or has already started.

8. The UE of claim 5, wherein the measurement configuration file and the associated configuration identifier are stored at the UE for a predetermined amount of time.

9. A computer program product comprising a non-transitory computer readable storage medium having computer readable program code embodied in the medium, the computer readable program code comprising:
    computer readable program code to receive a measurement configuration message via a radio network node, the measurement configuration message comprising a configuration identifier associated with a measurement configuration file,
        wherein the measurement configuration message is received over a control plane, and
        wherein the measurement configuration message is a radio resource control (RRC) message;
    computer readable program code to compare the received configuration identifier with a previously received configuration identifier, wherein the previously received configuration identifier is associated with last retrieved measurement configuration file;
    computer readable program code to determine a need for retrieving the measurement configuration file from the radio network node prior to retrieving the measurement configuration file from the radio network node,
        wherein the determination of the need for retrieving the measurement configuration file is based on a result of the comparison that the received configuration identifier is different from the previously received configuration identifier; and
    computer readable program code to retrieve, based on the determination, the measurement configuration file from the radio network node using the received configuration identifier,
        wherein the retrieving of the measurement configuration file from the radio network node using the received configuration identifier comprises:
        transmission of a request for the measurement configuration file to the radio network node; and
        reception of the measurement configuration file from the radio network node.

10. A method in a radio network node, the method comprising:
    transmitting a measurement configuration message to a user equipment (UE), the measurement configuration message comprising a configuration identifier associated with a measurement configuration file,
        wherein the measurement configuration message is transmitted over a control plane, and
        wherein the measurement configuration message is a radio resource control (RRC) message;
    providing, based on the received request, the measurement configuration file to the UE, wherein the providing of the measurement configuration file to the UE comprises:
    receiving a request for the measurement configuration file from the UE, wherein the request is received based on a result of a comparison that the transmitted configuration identifier is different from the previously transmitted configuration identifier, wherein the previously received configuration identifier is associated with last retrieved measurement configuration file; and
    transmitting the measurement configuration file to the UE.

11. The method of claim 10, further comprising receiving the measurement configuration file and the associated configuration identifier from a network node.

12. A radio network node, comprising:
circuitry configured to:
- transmit a measurement configuration message to a user equipment (UE), the measurement configuration message comprising a configuration identifier associated with a measurement configuration file,
  - wherein the measurement configuration message is transmitted over a control plane, and
  - wherein the measurement configuration message is a radio resource control (RRC) message;
- provide, based on the received request, the measurement configuration file to the UE, wherein the providing of the measurement configuration file to the UE comprises steps to:
- receive a request for the measurement configuration file from the UE, wherein the request is received based on a result of a comparison that the transmitted configuration identifier is different from the previously transmitted configuration identifier, wherein the previously received configuration identifier is associated with last retrieved measurement configuration file; and
- transmit the measurement configuration file to the UE.

13. The radio network node of claim 12, is further configured to:
receive the measurement configuration file and the associated configuration identifier from a network node.

14. A computer program product comprising a non-transitory computer readable storage medium having computer readable program code embodied in the medium, the computer readable program code comprising:
computer readable program code to transmit a measurement configuration message to a user equipment (UE), the measurement configuration message comprising a configuration identifier associated with a measurement configuration file,
- wherein the measurement configuration message is transmitted over a control plane, and
- wherein the measurement configuration message is a radio resource control (RRC) message;

computer readable program code to provide, based on the received request, the measurement configuration file to the UE, wherein the providing of the measurement configuration file to the UE comprises steps to:
- receive a request for the measurement configuration file from the UE, wherein the request is received based on a result of a comparison that the transmitted configuration identifier is different from the previously transmitted configuration identifier, wherein the previously received configuration identifier is associated with last retrieved measurement configuration file; and
- transmit the measurement configuration file to the UE.

\* \* \* \* \*